United States Patent [19]

Misra et al.

[11] Patent Number: 5,707,752
[45] Date of Patent: Jan. 13, 1998

[54] CERAMIC COATINGS TO PROTECT CELLULOSIC PRODUCTS

[75] Inventors: Mohan S. Misra, Golden; Edward A. Pierson, Littleton, both of Colo.

[73] Assignee: Technology Licensing Associates, Inc., Denver, Colo.

[21] Appl. No.: 443,691

[22] Filed: May 18, 1995

[51] Int. Cl.$^6$ .................................................. B32B 21/04
[52] U.S. Cl. ........................................ 428/537.1; 427/254
[58] Field of Search ........................... 428/452, 537.1; 427/254

[56] References Cited

U.S. PATENT DOCUMENTS

| | | |
|---|---|---|
| 3,097,932 | 7/1963 | Goldheim . |
| 3,449,145 | 6/1969 | Bloom et al. . |
| 3,649,406 | 3/1972 | McNish . |
| 4,083,905 | 4/1978 | Insley et al. ........................ 264/44 |
| 4,160,073 | 7/1979 | Lloyd-Lucas et al. . |
| 4,305,976 | 12/1981 | Zubiate et al. . |
| 4,395,432 | 7/1983 | Rizzelli et al. . |
| 4,594,106 | 6/1986 | Tanaka et al. . |
| 5,322,075 | 6/1994 | Deevi et al. ......................... 131/194 |

OTHER PUBLICATIONS

IEE Transactions on Plasma Science, vol. 18, No. 6, Dec. 1990, "Plasma Spraying–An Innovative Coating Technique: Process Variants and Applications", pp. 968–973, E. Lugscheider and T. Weber.

Heat Resistant Materials, Proceedings of the First International Conference, Fontana, Wisconsin, USA/23–26, Sep. 1991, "Plasma Sprayed Alumina and Alumina–Titania Deposits for Heat Resistance Applications", pp. 387–394, M. Babl.

Paper Presented at the International Conference on Metallurgical Coatings, San Diego, CA, U.S.A., Apr. 9–13, 1984, "Historical Review and Update to the State of the Art of Automation for Plasma Coating Processes", pp. 445–456, P. Meyer and S. Muehlberger.

Paper Presented at the International Conference on Metallurgical Coatings, San Diego, CA, U.S.A., Apr. 9–13, 1984, "On the Properties of Plasma–Sprayed Oxide and Metal–Oxide Coatings", pp. 457–466 O. Knotek, R. Elsing and N. Strompen.

Paper Presented at the International Conference on Metallurgical Coatings, San Diego, CA, U.S.A., Apr. 9–13, 1984, "Oxide Powders for Plasma Spraying—The Relationship Between Powder Characteristics and Coating Properties", pp. 467–475, D. Chuanxian, R.A. Zatorski and H. Herman.

*Primary Examiner*—Christopher Raimund
*Attorney, Agent, or Firm*—Tarolli, Sundheim, Covell, Tummino & Szabo

[57] ABSTRACT

A cellulosic substrate is impregnated using a plasma gun. A plasma spray of a ceramic material is applied to a first surface of the cellulosic substrate. The ceramic material improves various properties of the first surface of the cellulosic substrate.

27 Claims, 1 Drawing Sheet

CERAMIC COATINGS TO PROTECT CELLULOSIC PRODUCTS

BACKGROUND OF THE INVENTION

Wood and products made from wood are obtained from cellulosic sources. Wood and wood products are widely used construction materials. Wood and wood products, however, suffer from various defects.

Unless wood and wood products are specially treated they are not moisture resistant and are thus prone to swelling. Wood is also a combustible material and treatment with fire retardants is often necessary. Biological action on wood and wood products such as mildew and dry rot is also a serious limitation to the use of wood. Wood and wood products are also subject to attack by pests such as termites and carpenter ants.

Wood and wood products are also subject to deterioration from the elements such as wind, rain, hail and as well the drying effects of the sun. Ultraviolet radiation from the sun is also capable of damaging wood and wood products. Additional problems in using wood and wood products involve chemical exposure to solvents and/or acid rain. The foregoing must be considered when a decision on using wood or wood products in construction is made. Often the cost of curing the deficiency in the wood or wood products is excessive and another building material is used in the alternative.

The present invention deals with a safe, inexpensive and simple method for treating cellulosics such as wood and wood products to render the cellulosic less subject to wear or deterioration from wind, sun (drying and ultraviolet), hail, water, pests, acid rain and chemicals.

SUMMARY OF THE INVENTION

The present invention is an article having a cellulosic substrate which is impregnated with a ceramic material.

A further aspect of the present invention is a method of obtaining an article having a cellulosic substrate treated with a ceramic material comprising the steps of: obtaining the cellulosic substrate having a first surface; orienting the cellulosic substrate to receive a treatment of a plasma spray of the ceramic material on the first surface of the cellulosic substrate; and subjecting the first surface of the cellulosic substrate to the plasma spray of the ceramic material thereby obtaining the article having the cellulosic substrate treated with the ceramic material.

The present invention is also a method wherein a cellulosic substrate is improved, when subjected to a treatment, with regard to one or more properties of termite resistance, mildew resistance, and dry rot resistance, when compared to an identical untreated cellulosic substrate, the treatment comprising impregnating the cellulosic substrate with a ceramic material.

The present invention is also a method of construction comprising connecting a first article having a cellulosic substrate impregnated with a ceramic material, with a second article having a cellulosic substrate impregnated with a ceramic material.

BRIEF OF THE DESCRIPTION

Further features of the present invention will become apparent to those skilled in the art to which the present invention relates from reading the following specification with reference to the accompanying drawings, in which:

FIG. 1 is an illustration of treating a cellulosic substrate in accordance with the present invention; and FIG. 2 is a second illustration of treating a cellulosic substrate according to the present invention.

DESCRIPTION OF PREFERRED EMBODIMENT

Figure 1:
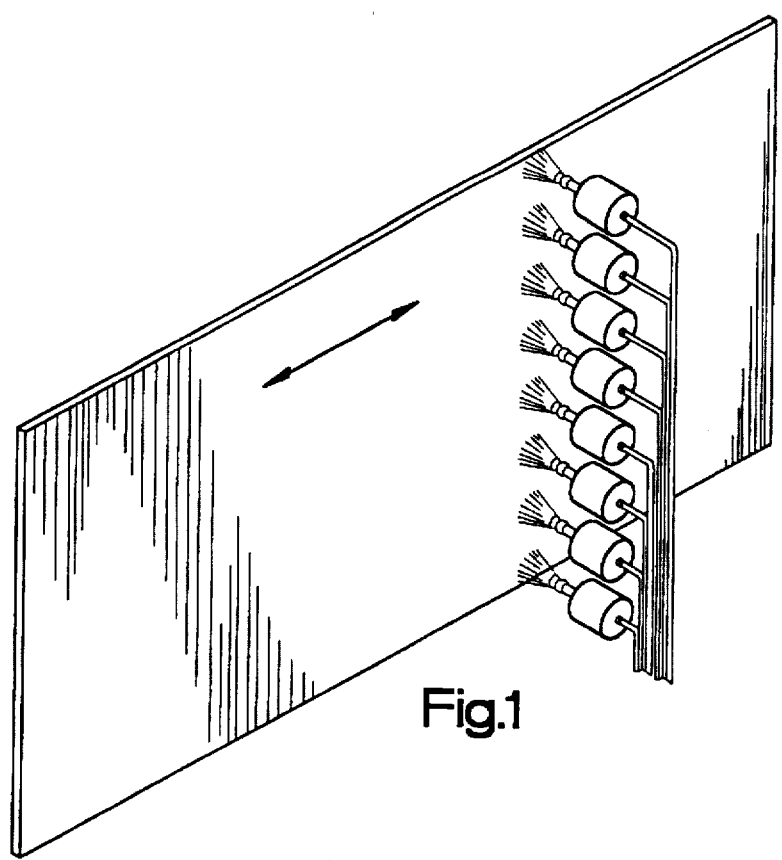

The present invention deals with treating a cellulosic substrate with a ceramic material. Among the various cellulosic substrates which may be treated according to the invention are logs, cut planks, and various types of pre-formed cellulosic substrates. Among the pre-formed cellulosic substrates are plywood, oriented strand board (OSB), particle board, chip board and other products made of wood chips, particles and sawdust. A further example of a cellulosic substrate is bagasse which is a product made from crushed sugar cane.

The present invention is most useful in treating preformed wooden products, and in particular, plywood, particle board, chip board and oriented strand board. Preformed wooden products differ in strength and cost. Plywood is preferred for strength. Plywood has two veneer sheets of high quality wood. The plywood veneer may be a thin slice of wood taken from a single log. The two veneer sheets of plywood are aligned such that the grain of the wood is in the same direction for each sheet. Plywood has one or more interior sheets of a non-veneer quality wood. The grain direction of plywood having a single interior sheet is typically parallel to that of the grain of the two veneer sheets. Plywood with more than one interior sheet may alternate the grain of the wood of the interior sheets. Thus multilayered plywood will have the interior sheets which have the grain alternating between being parallel to the veneer grain and perpendicular to the veneer grain.

Chip board is an inexpensive material made from chipped wood by-products from the saw mill processing of logs and lumber. The chipped wood is glued together and pressed to the desired shape to obtain the chip board. Particle board is similar to chip board except that whole logs are intentionally chipped and formed to a uniform size of wood particle. The wood particles are then glued and pressed to a desired shape to obtain the particle board.

Oriented strand board is a particular type of pressed wood wherein the strands of wood are parallel in the finished product. Long strands of wood are cut from logs for use in oriented strand board. Oriented strand board is prepared in sheets similar to plywood. Oriented strand board is particularly strong due to the grain orientation.

Oriented strand board is preferred in the present invention as this material is of relatively high strength, and low cost. Therefore oriented strand board is an excellent substitute for more expensive plywood.

The ceramic materials of the present invention are any of the ceramic materials used for other processes in which a ceramic material is required. Typically, a ceramic material is an inorganic oxide. Silicon dioxide ($SiO_2$) is often utilized as a ceramic material. Metallic oxides may be used as the ceramic material in the present invention.

Metallic oxides which may be utilized in the present invention include aluminum oxide ($Al_2O_3$), titanium oxide ($TiO_2$), zirconium oxide ($ZrO_2$), yttrium oxide ($Y_2O_3$) Additional metallic oxides which may be utilized are beryllium oxide, magnesium oxide, calcium oxide, strontium oxide, barium oxide, lanthanum oxide, gallium oxide, indium oxide, cerium oxide and the like.

Useful metal oxides in the present invention which contain more than one metal (double oxides) include ceramic materials such as the perovskite-type oxides such as sodium niobium trioxide ($NaNbO_3$), strontium zirconium trioxide (SrZrO₃), lead zirconium trioxide (PbZrO₃), strontium titanium trioxide (SrTiO₃), barium zirconium trioxide (BaZrO₃), barium titanium trioxide (BaTiO₃).

Additional metallic oxides useful in the present invention are the spinel-type oxides such as magnesium aluminum oxide (MgAl₂O₄), zinc aluminum oxide (ZnAl₂O₄), cobaltous aluminum oxide (CoAl₂O₄), nickel aluminum oxide (NiAl₂O₄), nickel chromium oxide (NiCr₂O₄), ferrous chromium oxide (FeCr₂O₄), magnesium ferric oxide (MgFe₂O₄), and zinc ferric oxide (ZnFe₂O₄).

Also useful herein are the illmenite-types of ceramic oxides such as magnesium titanium oxide (MgTiO12₃), manganese titanium oxide (MnTiO₃), ferrous titanium oxide (FeTiO₃), cobalt titanium oxide (CoTiO₃), zinc titanium oxide (ZnTiO₃), lithium tantalum oxide (LiTaO₃), and garnet-type oxides such as gadolinium gallium oxide (Gd₃Ga₅O₁₂) and rare earth-iron garnet such as yttrium ferric oxide (Y₃Fe₅O₁₂).

Of the foregoing ceramic materials it is most preferred to use silicon dioxide or aluminum trioxide. Silicon dioxide and aluminum trioxide provide excellent properties, as described below, to the cellulosic substrate. Wood and wood products treated with silicon dioxide or aluminum trioxide according to the present invention are less subject to wind, sun (drying and ultraviolet), hail, water, pests, acid rain and chemicals than untreated wood.

The next aspect to be discussed in the present invention is the equipment utilized to treat the cellulosic substrate with the ceramic material. The impregnation method of applying the ceramic material to the cellulosic substrate employs a plasma spray system or a plasma detonation system. Plasma spray systems are manufactured and marketed under the tradename Metco 7M and Metco 9M 80 kW spray systems. Plasma detonation systems are manufactured and marketed under the trade name Metco Diamond Jet Gun System. The plasma spray system and the plasma detonation system are available from the Metco Division of Perkin-Elmer, Westbury, New York. A second source of equipment suitable for use with the present invention is TAFA Incorporated based in Concord, New Hampshire.

A Metco control unit FMCII and Metco AR2000 6 degree of freedom robot system may be employed to aid in applying the ceramic material. A Metco 4MP feeder may be employed to deliver the ceramic material to the plasma gun. The foregoing equipment is also available from Perkin-Elmer.

Plasma spray systems operate by injecting a ceramic powder into the inert gas plasma generated by the plasma gun. The plasma un accelerates the ceramic particles to a very high velocity at a very high temperature. The high velocity high temperature plasma spray is directed toward the wood substrate where the particles of the ceramic material strike and impregnate (penetrate) the cellulosic substrate to form an adherent coating. The adherent coating extends into the surface of the wood due to the high velocity of the ceramic material. The plasma spray may be allowed to build up past the surface of the wood.

A carrier gas, which is preferably argon or nitrogen, is required to carry the ceramic material into the electric arc of the plasma gun. The particles of the ceramic material are entrained in a jet of the carrier gas which passes through the electric arc. The particles of ceramic material are melted in the electric arc and are directed to the cellulosic substrate. The plasma gun may be adjusted by varying the power to the electric arc. The power to the electric arc allows differing ceramic particle sizes to be used. The power setting also ensures that the ceramic material melts in the electric arc.

The power to the plasma gun may also be varied to provide that the ceramic material strikes the cellulosic substrate at a velocity sufficient to cause impregnation of the cellulosic substrate.

When desired a plasma detonation system may be employed to deliver the ceramic material to the cellulosic substrate. The process in a plasma detonation system is generally similar to the conventional plasma spray process described above. The plasma detonation gun system differs in detonating a mixture of hydrogen and oxygen near the tip of the nozzle through which the ceramic material is fed.

The detonation of hydrogen and oxygen in the plasma detonation gun system significantly increases the velocity of the ceramic particles and the resultant temperature of the ceramic material in the plasma. As a result of using the plasma detonation system the ceramic material penetrates deeper into the cellulosic substrate and with a greater density when compared to a conventional plasma spray gun. The ceramic material applied by a plasma detonation system will thus impregnate, and form a coating on the cellulosic substrate which is stronger and more dense than an ordinary plasma spray. Cellulosic substrates which are expected, in use, to undergo significant abrasive action and which must withstand high ambient temperatures are benefited by the plasma detonation system.

Operation

It is desirable to clean the surface of the cellulosic substrate prior to the ceramic impregnation. A solvent such as acetone may be used for cleaning the cellulosic substrate. The cleaning with acetone removes loose particles of sawdust and the like from the cellulosic substrate. The acetone is not harmful to the adhesive materials (glues) which are used to form the cellulosic substrate. The solvent should be allowed to evaporate prior to the ceramic impregnation.

Referring to FIG. 1 a cellulosic substrate 10 is shown in an arrangement with a plurality of plasma spray guns 20. The system as described may also use a plasma detonation spray gun 20. The cellulosic substrate 10 (oriented strand board) is a 4'×8'×½" sheet. The cellulosic substrate is oriented to receive a treatment from the plurality of plasma guns 20. The plasma guns 20 apply a plasma spray of a ceramic material on a first surface 40 of the cellulosic substrate 10. The cellulosic substrate 10 is mounted by mounting means (not shown) such that the 4' width of the cellulosic substrate is vertical. Vertical mounting of the cellulosic substrate is preferred to allow easy treatment of either large surface of a 4'×8' sheet. The four narrow edge portions of the 4'×8' sheet may also be treated, however, this is a matter of choice depending on the end use of the cellulosic substrate 10.

The cellulosic substrate 10 is traversed by the vertical arrangement of plasma guns 20 at a speed of 1.6 to 2.0 meters per second. The plasma guns 20 are mounted such that the distance from the nozzle of the plasma gun 20 to the first surface 40 of the cellulosic substrate is from 3 to 12 inches. The spray pattern 30 of each nozzle of each plasma gun may be set to from 0.5 to 8 inches of coverage on the first surface of the cellulosic substrate.

The manner of orientation of the plasma guns 20 in FIG. 1 is a matter of choice. The plasma guns 20 may pass over and apply several treatments to the cellulosic substrate. Alternatively, a sheet of the cellulosic substrate 10 may pass each plasma gun 20 one or more times. The direction of the cellulosic substrate 10 may be reversed such that the sheet having once traversed the array of plasma guns 20 is subjected to another pass for treatment by the plasma guns 20.

A second treatment of the cellulosic substrate 10 may also be accomplished by continuing a single direction of travel of the cellulosic substrate 10. The cellulosic substrate 10 then has a second impregnation by a second array of plasma guns 20 (not shown). It is also possible to apply a different ceramic material to the cellulosic substrate in a second treatment. If desired, both the first large surface 40 of a sheet of the cellulosic substrate and the reverse surface such may be treated simultaneously.

Figure 2:
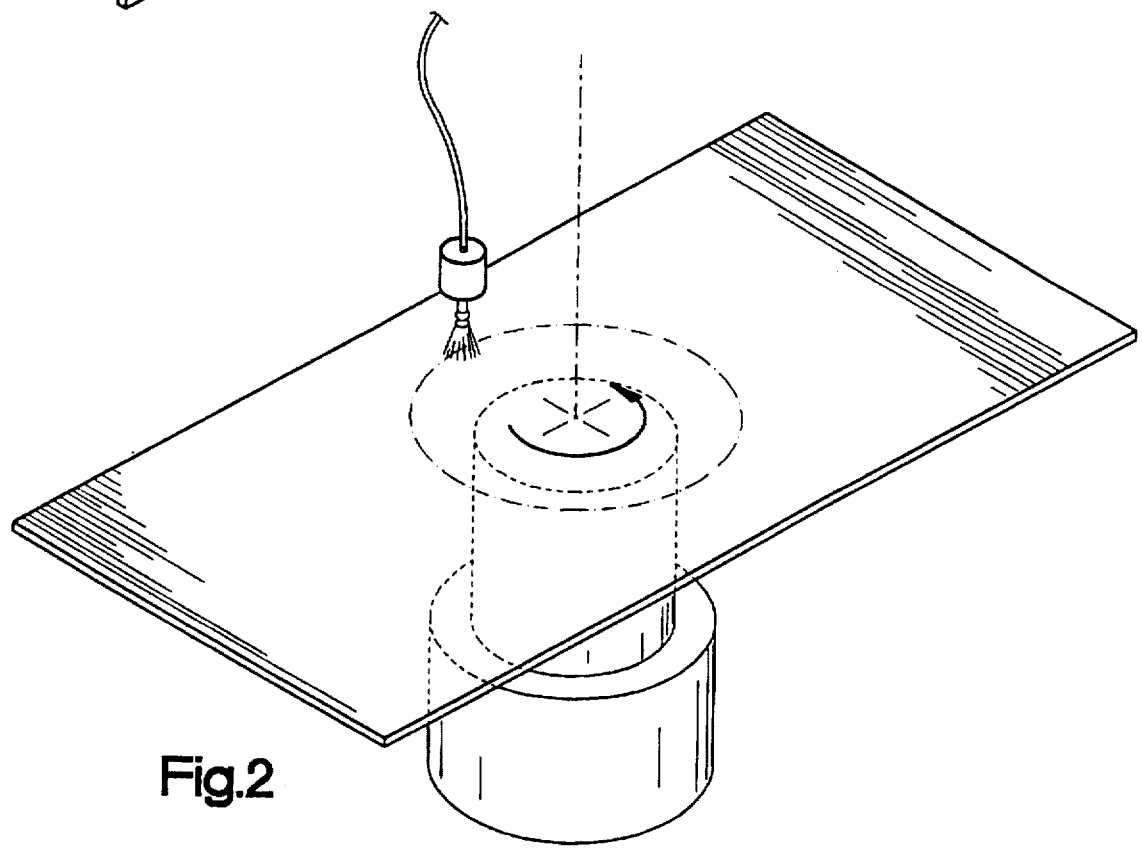

FIG. 2 shows a second arrangement whereby a single plasma gun 120 is oriented to apply a ceramic spray 130 to a sheet of cellulosic substrate 10 which is rotatable on a turntable 140. The turntable 140 operates at 300 rpm. The single plasma gun 120 is translatable in a forward (toward the right) and reverse direction. The path of movement of the plasma gun 120 is shown by the large arrows. Impregnation the of the ceramic material into the cellulosic substrate 10 is accomplished as otherwise described above.

In the foregoing manner, the cellulosic substrate is treated with the ceramic material to obtain an impregnation from the first surface of the cellulosic substrate to the interior of the cellulosic substrate to a depth of from $1 \times 10^{-5}$ to $1 \times 10^{-1}$ inch. The cellulosic substrate is conveniently treated such that the ceramic material extends above the original surface of the cellulosic substrate from $5 \times 10^{-4}$ to $5 \times 10^{-1}$ inch.

The densities of the coatings obtained by the ceramic impregnation of the cellulosic substrate method described herein are 90+%. A density of 90% indicates that the ceramic coating is 90% as dense as the maximum possible if the coating were otherwise a melted ceramic material.

EXAMPLE

A cellulosic substrate (a 4'×8'½"sheet of oriented strand board) is treated with a plasma spray utilizing a Metco 9M, 80kW Plasma Spray System with a 7MCII control unit. The plasma spray gun is mounted to a Metco AR2000 6 degree of freedom robot which performed a traversing operation applying the ceramic material to the cellulosic substrate at 1.6 meters per second.

An aluminum oxide powder is fed to the plasma spray system by a Metco 4MP feeder with the powder fed normal (90° to the plasma spray gun). The carrier gas is nitrogen at 20 psi. The nozzle of the spray gun is 4.25" from the cellulosic surface to be treated. The plasma gun is set for a 4" focus. Cooling water to the plasma gun is maintained at 50° F. during the impregnation operation.

The cellulosic substrate is maintained in a stationary, vertical position and the robot traverses the cellulosic substrate in a step-wise manner until a coating 0.008" thick of the ceramic material is deposited.

The cellulosic substrate treated in the above manner is less subject to wear or deterioration from wind, sun, hail, water, pests, acid rain and chemicals than a similar untreated cellulosic substrate. The cellulosic substrate treated in the above manner is fire retardant.

From the above description of the invention, those skilled in the art will perceive improvements, changes and modifications. Such improvements, changes and modifications within the skill of the art are intended to be covered by the appended claims.

Having described the invention, the following is claimed:

1. An article having a cellulosic substrate wherein said cellulosic substrate is impregnated by a plasma detonation spray of ceramic material.

2. The article of claim 1 wherein said cellulosic substrate is wood.

3. The article of claim 1 wherein said cellulosic substrate has a first surface and said first surface of said cellulosic substrate is impregnated by said ceramic material to the interior of said cellulosic substrate to a depth of from $1 \times 10^{-5}$ to $1 \times 10^{-1}$ inch.

4. The article of claim 1 wherein said cellulosic substrate has a first surface and said first surface of said cellulosic substrate is impregnated with said ceramic material wherein said ceramic material after impregnation extends above said first surface of said cellulosic substrate from $5 \times 10^{-4}$ to $5 \times 10^{-1}$ inch.

5. The article of claim 1 wherein said cellulosic substrate is selected from the group consisting of particle board, plywood, chip board and oriented strand board.

6. An article having a cellulosic substrate wherein said cellulosic substrate is impregnated with a ceramic material, wherein said cellulosic substrate is wood.

7. The article of claim 6 wherein said cellulosic substrate has a first surface and said first surface of the cellulosic substrate is impregnated by said ceramic material to the interior of said cellulosic substrate to a depth of from $1 \times 10^{-5}$ to $1 \times 10^{-1}$ inch.

8. The article of claim 6 wherein said ceramic material is a metallic oxide.

9. The article of claim 6 wherein said cellulosic substrate is improved with regard to one or more properties of termite resistance, mildew resistance, or dry rot resistance compared to an identical non-impregnated cellulosic substrate.

10. The article of claim 6 wherein said ceramic material is selected from the group consisting of aluminum oxide and silicon dioxide and mixtures thereof.

11. The article of claim 6 wherein said cellulosic substrate has a first surface and said first surface of the cellulosic substrate is impregnated with said ceramic material wherein said ceramic material after impregnation extends above said first surface of said cellulosic substrate from $5 \times 10^{-4}$ to $5 \times 10^{-}$ inch.

12. An article having a cellulosic substrate with a thickness of at least about $25 \times 10^{-2}$ inch wherein said cellulosic substrate is impregnated with a ceramic material.

13. An article having a cellulosic substrate selected from the group consisting of particle board, plywood, chip board and oriented strand board wherein said cellulosic substrate is impregnated with a ceramic material.

14. The article of claim 13 wherein said ceramic material is selected from the group consisting of aluminum oxide and silicon dioxide and mixtures thereof.

15. A method of construction comprising the steps of:
providing a first article having a wooden cellulosic substrate impregnated with a ceramic material;
providing a second article having a wooden cellulosic substrate impregnated with a ceramic material; and
connecting said first article with said second article.

16. The method of claim 15 wherein said wooden cellulose substrates are selected from the group consisting of particle board, plywood, chip board and oriented strand board.

17. The method of claim 15 wherein said wooden cellulose substrate has a thickness of at least about $25 \times 10^{-2}$ inch.

18. A method of obtaining an article having a cellulosic substrate impregnated with a ceramic material comprising the steps of:
obtaining said cellulosic substrate, said cellulose substrate being wood;
orienting said cellulosic substrate to receive a treatment of said ceramic material; and impregnating said cellulosic substrate with said ceramic material;

thereby obtaining the article having said cellulosic substrate impregnated with said ceramic material.

19. The method of claim 18 wherein said wooden cellulose substrates are selected from the group consisting of particle board, plywood, chip board and oriented strand board.

20. A method of obtaining an article having a cellulosic substrate treated with a ceramic material comprising the steps of:

obtaining said cellulosic substrate having a first surface;

orienting said cellulosic substrate to receive a treatment of a plasma spray of said ceramic material on said first surface of said cellulosic substrate; and, subjecting said first surface of said cellulosic substrate to said plasma spray of said ceramic material;

thereby obtaining the article having said cellulosic substrate treated with said ceramic material, wherein said cellulosic substrate is wood.

21. The method of claim 20 wherein said ceramic material is a metallic oxide.

22. The method of claim 20 wherein a carrier gas is employed to deliver said ceramic material to said plasma spray.

23. The method of claim 20 wherein said ceramic material is selected from the group consisting of aluminum oxide and silicon dioxide and mixtures thereof.

24. The method of claim 20 wherein said wooden cellulose substrate is selected from the group consisting of particle board, plywood, chip board and oriented strand board.

25. The method of claim 20 wherein said plasma spray comprises a plasma detonation spray.

26. The method of claim 25 wherein said wooden cellulose substrate is selected from the group consisting of particle board, plywood, chip board and oriented strand board.

27. A method of obtaining an article having a cellulosic substrate treated with a ceramic material comprising the steps of:

obtaining said cellulosic substrate having a first surface;

orienting said cellulosic substrate to receive a treatment of a plasma detonation spray of said ceramic material on said first surface of said cellulosic substrate; and, subjecting said first surface of said cellulosic substrate to said plasma detonation spray of said ceramic material;

thereby obtaining the article having said cellulosic substrate treated with said ceramic material.

* * * * *